(12) United States Patent
Kim (10) Patent No.: US 9,453,483 B2
(45) Date of Patent: *Sep. 27, 2016

(54) FUEL INJECTOR FOR DUAL FUEL COMMON RAIL SYSTEM

(75) Inventor: Hoisan Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1419 days.

This patent is subject to a terminal disclaimer.

(21) Appl. No.: 13/221,187

(22) Filed: Aug. 30, 2011

(65) Prior Publication Data

US 2013/0047964 A1 Feb. 28, 2013

(51) Int. Cl.
| | |
|---|---|
| *F02B 3/00* | (2006.01) |
| *F02B 5/00* | (2006.01) |
| *F02M 43/04* | (2006.01) |
| *F02D 19/06* | (2006.01) |
| *F02M 63/00* | (2006.01) |
| *F02M 47/02* | (2006.01) |
| *F02D 19/10* | (2006.01) |
| *F02M 55/02* | (2006.01) |

(52) U.S. Cl.
CPC .......... *F02M 43/04* (2013.01); *F02D 19/0647* (2013.01); *F02D 19/0694* (2013.01); *F02D 19/10* (2013.01); *F02M 47/027* (2013.01); *F02M 63/008* (2013.01); *F02M 63/0019* (2013.01); *F02M 63/0035* (2013.01); *F02M 63/0064* (2013.01); *F02M 55/02* (2013.01); *F02M 2200/44* (2013.01); *Y02T 10/36* (2013.01)

(58) Field of Classification Search
CPC ... Y02T 10/36; Y02T 10/32; F02D 41/0025; F02D 19/081; F02D 19/0647; F02D 19/0644; F02D 19/0642

USPC ....... 123/304, 445, 525, 527, 299, 575, 576, 123/577, 578; 239/413, 417.5; 701/103
See application file for complete search history.

(56) References Cited

U.S. PATENT DOCUMENTS

| | | | |
|---|---|---|---|
| 6,027,037 A * | 2/2000 | Murakami et al. | ............. 239/88 |
| 6,267,306 B1 | 7/2001 | Phillips et al. | |
| 6,328,230 B1 | 12/2001 | Prillwitz et al. | |
| 6,601,566 B2 | 8/2003 | Gillis et al. | |
| 6,739,522 B2 * | 5/2004 | Laumen | ......................... 239/407 |
| 6,769,635 B2 | 8/2004 | Stewart et al. | |
| 6,856,222 B1 | 2/2005 | Forck | |
| 6,945,475 B2 | 9/2005 | Lawrence et al. | |
| 7,278,593 B2 | 10/2007 | Wang et al. | |
| 7,373,931 B2 | 5/2008 | Lennox et al. | |
| 7,556,017 B2 | 7/2009 | Gibson | |

(Continued)

FOREIGN PATENT DOCUMENTS

EP 1275840 1/2003

*Primary Examiner* — Sizo Vilakazi (57) ABSTRACT

A duel fuel system includes a plurality of fuel injectors that have a non-injection configuration, a liquid fuel injection configuration, a gaseous fuel injection configuration and a combined fuel injection configuration. Each of the fuel injectors is fluidly connected to a gaseous fuel common rail and a liquid fuel common rail. Each of the fuel injectors includes a three way gas control valve and a three way liquid control valve that move along a common centerline. A gas control chamber of each fuel injector is fluidly connected to the liquid fuel common rail by two passages in parallel when the gas control valve member is in a first position corresponding to the non-injection configuration. The liquid control chamber of each fuel injector is also fluidly connected to the liquid fuel common rail by two passages in parallel when the liquid control valve is in a first position, again corresponding to the non-injection configuration.

18 Claims, 6 Drawing Sheets

(56) References Cited

U.S. PATENT DOCUMENTS

| | | | |
|---|---|---|---|
| 8,844,842 B2* | 9/2014 | Kim et al. ............... | 239/408 |
| 8,925,519 B2* | 1/2015 | Kim et al. ............... | 123/299 |
| 2004/0055562 A1* | 3/2004 | Stewart et al. ........... | 123/299 |
| 2005/0098144 A1* | 5/2005 | Stewart et al. ........... | 123/299 |
| 2013/0047964 A1* | 2/2013 | Kim ......................... | 123/478 |
| 2013/0081593 A1* | 4/2013 | Coldren ................... | 123/304 |
| 2013/0098333 A1* | 4/2013 | Kim et al. ............... | 123/445 |
| 2013/0118448 A1* | 5/2013 | Kim et al. ............... | 123/299 |

* cited by examiner

FUEL INJECTOR FOR DUAL FUEL COMMON RAIL SYSTEM

TECHNICAL FIELD

The present disclosure relates generally to dual fuel common rail systems, and more particularly to a dual fuel injector for fueling an engine with gaseous and liquid fuels, respectively.

BACKGROUND

Gaseous fuel engines are known for their ability to burn clean relative to their compression ignition engine counterparts. However, gaseous fuels are well known for the difficulty in attaining successful ignition. Some gaseous fuel engines utilize a spark plug, whereas other engines are known for utilizing a small amount of distillate diesel fuel that is compression ignited to in turn ignite a larger charge of gaseous fuel. Practical spatial limitations in and around an engine often make it difficult to find space for all of the plumbing and hardware associated with supplying two different fuels to each combustion chamber. U.S. Pat. No. 7,373,931 teaches a dual fuel engine that utilizes a small quantity and compression ignited distillate diesel fuel to ignite a larger charge of gaseous fuel. This reference teaches the use of a fuel injector with nested needle valve members to facilitate injection of both the gaseous and liquid fuels from the same injector into each engine cylinder. However, the structure of the injector can lead to cross leakage between fuels, leakage of fuel into the engine cylinder and stacked tolerances that may lead to substantial performance variations when the fuel injectors are mass produced. In addition, the injector structure inherently requires different injection patterns depending upon whether the fuels are being injected individually or at the same time.

The present disclosure is directed toward one or more of the problems set forth above.

SUMMARY OF THE DISCLOSURE

In one aspect, a fuel injector includes an injector body that defines a first nozzle outlet set, a first fuel inlet, a second nozzle outlet set, a second fuel inlet and a drain outlet. Exposed in the injector body are a first nozzle chamber fluidly connected to the first fuel inlet, a second nozzle chamber fluidly connected to the second fuel inlet, a first control chamber fluidly connected to the first fuel inlet, and a second control chamber fluidly connected to the first fuel inlet. A first needle control valve is positioned in the injector body and includes a first control valve member movable between a first position in contact with a conical seat to close a fluid connection between the first control chamber and the drain outlet, and a second position out of contact with the conical seat to open the first fluid connection. The second needle control valve is positioned in the injector body and includes a second control valve member movable between a first position in contact with a conical seat to close a second fluid connection between the second control chamber and the drain outlet, and a second position out of contact with the conical seat to open the second fluid connection. A first solenoid actuator has a first armature operably coupled to the first needle control valve, and a second electrical actuator has a second armature operably coupled to the second needle control valve.

In another aspect, a dual fuel system includes a plurality of fuel injectors that have a non-injection configuration, a liquid fuel injection configuration, a gaseous fuel injection configuration and a combined fuel injection configuration. A gaseous fuel common rail is fluidly connected to each of the fuel injectors. A liquid fuel common rail is also fluidly connected to each of the fuel injectors. Each of the fuel injectors includes a three way gas control valve with a gas control valve member and a three way liquid control valve with a liquid control valve member that each move along a common centerline. A gas control chamber of each fuel injector is fluidly connected to the liquid fuel common rail by two passages in parallel when the gas control valve member is in a first position. A liquid control chamber of each fuel injector is fluidly connected to the liquid fuel common rail by two passages in parallel when the liquid control valve member is in a first position.

In still another aspect, a method of operating a dual fuel system includes injecting gaseous and liquid fuels through a gaseous nozzle outlet set in a liquid nozzle outlet set, respectively, of a fuel injector into an engine cylinder in an engine cycle. The liquid fuel is compression ignited. The step of injecting includes moving a first armature, a second armature, a liquid control valve member and a gas control valve member along a common centerline. The step of moving the liquid control valve member includes closing one of two passages fluidly connecting a liquid needle control chamber to a liquid common rail, and opening a fluid connection from the liquid control chamber to a drain outlet. The step of moving a gaseous control valve member includes closing one of two passage fluidly connecting a gaseous needle control chamber to the liquid common rail, and opening a fluid connection from the liquid needle control chamber to a drain outlet.

DETAILED DESCRIPTION

Figure 1:
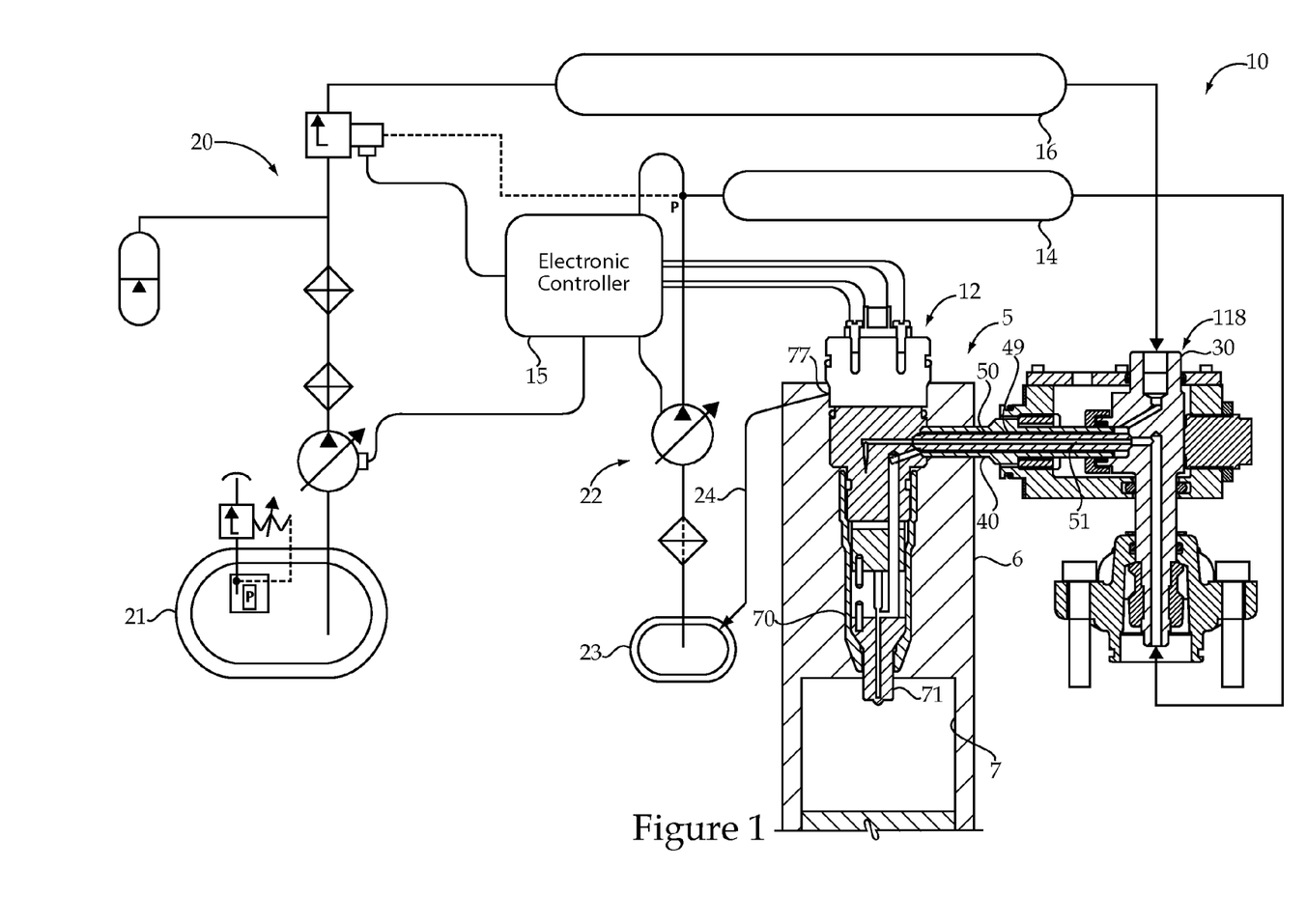
FIG. 1 is a schematic view of an engine and dual fuel common rail system according to the present disclosure.

Referring to FIG. 1, an engine 5 according to the present disclosure utilizes a dual fuel common rail system 10. Engine 5 includes an engine housing 6 that defines a plurality of cylinders 7, only one of which is shown. The dual fuel system 10 includes a plurality of fuel injectors 12 (only one shown) that each include an injector body 70 with a tip component 71 positioned for direct injection of gaseous fuel and/or liquid fuel into one of the engine cylinders 7. The dual fuel system 10 includes a plurality of concentric outer tubes 50 and inner tubes 40 that each extend into engine housing 6 between a quill 30 and one of the fuel injectors 12. Each of the inner tubes 50 is compressed between a conical seat on an associated quill 30 and a conical seat on one of the fuel injectors 12. Thus, each engine cylinder 7 has one associated fuel injector 12, one outer tube 40, one inner tube 50 and one quill 30. The dual fuel system 10 includes a gaseous fuel common rail 16 that is fluidly connected to each of the fuel injectors 12 through one of the quills 30 and an outer passage 49 defined between an inner tube 50 and an outer tube 40. A liquid fuel common rail 14 is fluidly connected to each of the fuel injectors 12 through one of the quills 30 and an inner passage 51 defined by the inner tube 50.

An electronic controller 15 is in control communication with each of the fuel injectors 12 to selectively control the timing and quantity of both gaseous and liquid fuel injection events. Electronic controller 15 is also in control communication with a gas pressure control device 20 that is operably coupled to control the pressure in gaseous fuel common rail 16, and also in control communication with a liquid pressure control device 22 operably coupled to control the pressure in liquid fuel common rail 14. Although individual gases, such as methane, propane and the like are within the scope of the present disclosure, natural gas containing a mixture of gas species is particularly applicable to the present disclosure. In addition, the liquid fuel is chosen for the ability for compression ignition at the compression ratio of engine 5. For instance, the liquid fuel may be distillate diesel fuel or some other liquid fuel that is suitable for compression ignition to in turn ignite a charge of gaseous fuel in one of the engine cylinders 7.

In the illustrated embodiment, natural gas is maintained in a liquid state in a cryogenic liquefied natural gas tank 21. A variable displacement cryogenic pump is controlled by electronic controller 15 to pump liquefied natural gas through filters and a heat exchanger for expansion into a gas that is maintained in an accumulator. The gas pressure control device 20 according to the present disclosure includes an electronically controlled valve that supplies a controlled quantity of gaseous fuel from the supply side (accumulator) to the gaseous fuel common rail 16. This described supply strategy for natural gas is particularly suitable when engine 5 is mounted on a moving machine, such as a mining truck or the like. On the otherhand, if engine 5 were stationary, a gas pressure control device may be connected to a source of available natural gas and then compressed and fed to gaseous fuel common rail 16 in a manner that is controlled by electronic controller 15 to maintain a desired pressure in the rail 16.

The liquid fuel supply to liquid fuel common rail 14 begins at a tank 23. In the illustrated embodiment, the liquid fuel pressure control device 22 includes a high pressure common rail fuel pump of a type well known in the art whose output can be controlled by electronic controller 15 to maintain some desired pressure in liquid common rail 14. Another alternative might include fixed displacement pump and a rail pressure control valve that returns a quantity of the fuel back to tank 23 in order to control pressure in liquid fuel common rail 14. Any of these alternative strategies fall within the contemplated scope of the present disclosure.

In the event that engine 5 is utilized in a moving machine, the present disclosure contemplates liquefied natural gas tank 21 having a larger capacity (may be 65% greater volume) than the distillate diesel fuel tank 23 in order to account for the expected ratios of consumption from both tanks when operating in a standard dual fueling configuration in which may be over 90% of the fuel delivery to engine 5 is in the form of natural gas and less than 10% in the form of distillate diesel fuel, by mass. This difference in sizing of tanks 21 and 23 also accounts for the densities of the respective liquids as well as the different heating values of the two fuels, as well as accounting for the fact that the natural gas is stored as a liquid but injected as a gas, whereas the distillate diesel fuel is stored and injected as a liquid into engine 5. When operating in a dual fueling mode corresponding to standard operation, electronic controller 15 has a dual fuel control algorithm configured to maintain the gaseous fuel common rail at a medium low pressure and the liquid fuel common rail 14 at a medium high pressure, corresponding to a small pressure differential. If engine 5 is operating in a limp home single fueling mode, the electronic controller 15 may include a single fuel control algorithm configured to maintain the gaseous fuel common rail 16 at a low pressure and the liquid common rail 14 at a high pressure, corresponding to a large pressure differential. For the sake of clarity, the identified high pressure is greater than the medium high pressure, which is greater than the medium low pressure, which is greater than the low pressure.

Figure 2:
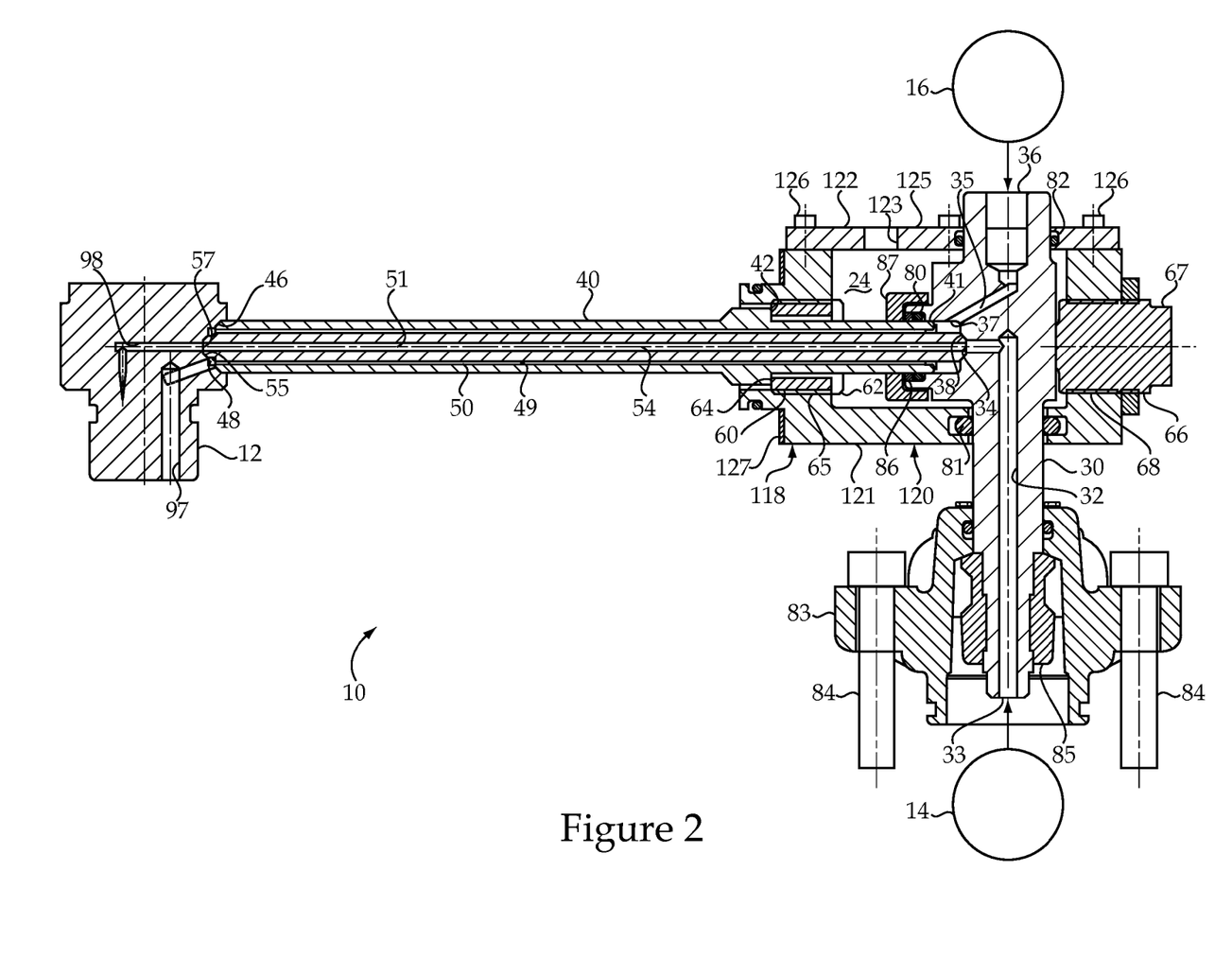
FIG. 2 is a side sectioned view of a portion of the dual fuel system of FIG. 1.

Referring to FIG. 2, the dual fuel common rail system 10 includes a coaxial quill assembly 118 fluidly connecting each fuel injector 12 with liquid and gas common rails 14, 16, respectively. Although the concepts of the present disclosure could apply to a variety of fuels for different types of engines, the illustrated embodiment is particularly suited for a gaseous fuel engine that utilizes distillate diesel fuel for compression ignition. In other words, an engine associated with dual fuel common rail system 10 might primarily burn liquefied natural gas supplied form second common rail 16, and ignite that charge in the engine combustion space by compression igniting a smaller charge of distillate diesel fuel from common rail 14 during a combustion event.

Coaxial quill assembly 118 includes a quill 30 at least partially positioned in a block 120. The quill includes a first fuel passage 32 extending between a first fuel inlet 33, which is fluidly connected to first common rail 14, and a first fuel outlet 34. Quill 30 also defines a second fuel passage 35 extending between a second fuel inlet 36, which is fluidly connected to second common rail 16, and a second fuel outlet 37. Quill 30 is fluidly connected to rails 14 and 16 using known hardware (e.g., fittings) and techniques. Fuel from first common rail 14 is moved through an engine housing 6 (engine head) via an inner passage 51 through inner tube 50, while fuel from second common rail 16 is moved to fuel injector 12 in an outer passage 49 defined between inner tube 50 and an outer tube 40. Inner tube 50 may be of a familiar construction to those skilled in the art, in that it includes rounded or conical ends that are compressed between a conical seat 38 of quill 30 and an inner conical seat 55 of fuel injector 12. Thus, the fluid passage 51 within inner tube 50 extends between first fuel outlet 34 of quill 30 and an inner fuel inlet 57 of fuel injector 12. Outer tube 40, which may have no contact with inner tube 50, has an inner diameter larger than an outer diameter of inner tube 50 in order to define an elongate outer passage 49 that opens on one end to second fuel outlet 37 of quill 30 and at its other end to an outer fuel inlet 48 of fuel injector 12. Outer tube 40 includes a rounded or conical end that is compressed into sealing contact with outer conical seat 46 of fuel injector 12. The outer fuel inlet 48 opens between the inner diameter of tube 40 and the outer surface of inner tube 50. Thus, fuel injector 12 defines an outer conical seat 46 that concentrically surrounds an inner conical seat 55. In addition, the fuel injector 12 includes an inner fuel inlet 57 surrounded by the inner conical seat 55 and the outer conical seat 46, and an outer fuel inlet 48 positioned between the inner conical seat 57 and the outer conical seat 46.

Outer tube 40 is compressed between quill 30 and the fuel injector 12. In particular, outer tube 40 includes a rounded or conical end in sealing contact with outer conical seat 46 and an opposite end received in a bore defined by quill 30. One end 41 outer tube 40 is sealed via an O-ring 80 that is positioned in a space 45 between outer tube 40 and quill 30. O-ring 80 is maintained in place against the pressure from second common rail 16 by a back up ring 86 held in place by a cap 87 threaded to quill 30. Outer tube 40 is compressed onto outer seat 46 of fuel injector 12 by an axial force applied to a load shoulder 42 by a compression load adjuster 60 that includes a contact surface 64 in contact with load shoulder 42. Compression load adjuster 60 includes outer threads 65 that mate with a set of inner threads defined by base 121 of block 120, and includes a tool engagement surface 62 located in hollow interior 124 of block 120 to facilitate adjusting a compression load on outer tube 40. Thus, leakage of the second fuel from common rail 16 to atmosphere is inhibited by setting a compression load on the outer tube 40 with compression load adjuster 60 above a predetermined threshold to facilitate a seal at outer conical seat 46, and by sealing the other end with o-ring 80.

Sealing at opposite ends of inner tube 50 is facilitated by a separate load adjuster 66 that includes threads 68 mated to internal threads defined by base 121 of block 120. Load adjuster 66 includes a tool engagement surface 67 located outside of block 20 that facilitates movement of compression load adjuster 66 along a common centerline 54. In other words, compression load adjuster 70 pushes along common centerline 54 against quill 30 to compress inner tube 50 between conical seat 38 of quill 30 and conical seat 55 of fuel injector 12. Because one end 41 of outer tube 40 can slide within quill 30, the respective compression loads on inner tube 50 and outer tube 40 can be adjusted independently to better insure proper sealing at all of the conical seats 38, 55 and 46. Thus, leakage of the first fuel originating from common rail 14 into the second fuel is inhibited by setting a compression load on the inner tube 50 above a predetermined threshold with compression load adjuster 66. In addition, leakage of the second fuel from common rail 16 into the first fuel from common rail 14 may include setting the pressure in common rail 14 higher than the pressure in common rail 16. Outer tube 40, inner tube 50, compression load adjuster 60, compression load adjuster 70, conical seat 38, inner conical seat 55 and outer conical seat 46 all share a common centerline 54. Other sealing strategies for one or both of inner tube 50 and outer tube 40 apart from that described in relation to the drawings also fall within the contemplated scope of the present disclosure.

As shown, quill 30 may be at least partially positioned within block 120, which includes a base 121 and a cover 122 that may be attached to base 121 by a plurality of fasteners 126. Base 121 may include a flange that facilitates attachment of block 120 to an engine head (housing 6) via bolts 128. As shown in the Figures, the first fuel inlet 33 and the second fuel inlet 36 of quill 30 may be located outside of block 120. A shim 127 may be included to adjust the distance between conical seat 38 and conical seat 57 to compensate for geometrical tolerances in the fuel system and engine components. Any of the second fuel that manages to leak past O-ring 80 into hollow interior 124 of block 120, may be vented to atmosphere via vent opening 123. Thus, vent opening 123 might be eliminated in a case where the fuel in common rail 16 is not gaseous at atmospheric pressure. Except for vent opening 123, hollow interior 24 may be substantially closed via an O-ring 81 that is in contact with quill 30 and block 120 and surrounds first fuel passage 32. In addition, a second O-ring 82 may be in contact with quill 30 and block 120 and surround the second fuel passage 35. Thus, vent opening 123 extends between hollow interior 125 and an outer surface 125 of block 120, which is exposed to atmosphere.

Coaxial quill assembly 118 may also include a flange 83, collar 85 and bolts 84 to facilitate a sealed fluid connection between quill 30 and common rail 14. Although co-axial quill assembly 118 is illustrated as including a separate block 120 and quill 30, those skilled in the art will appreciate that the functions and structures of those two components could be merged into a single component without departing from the present disclosure.

Figure 3:
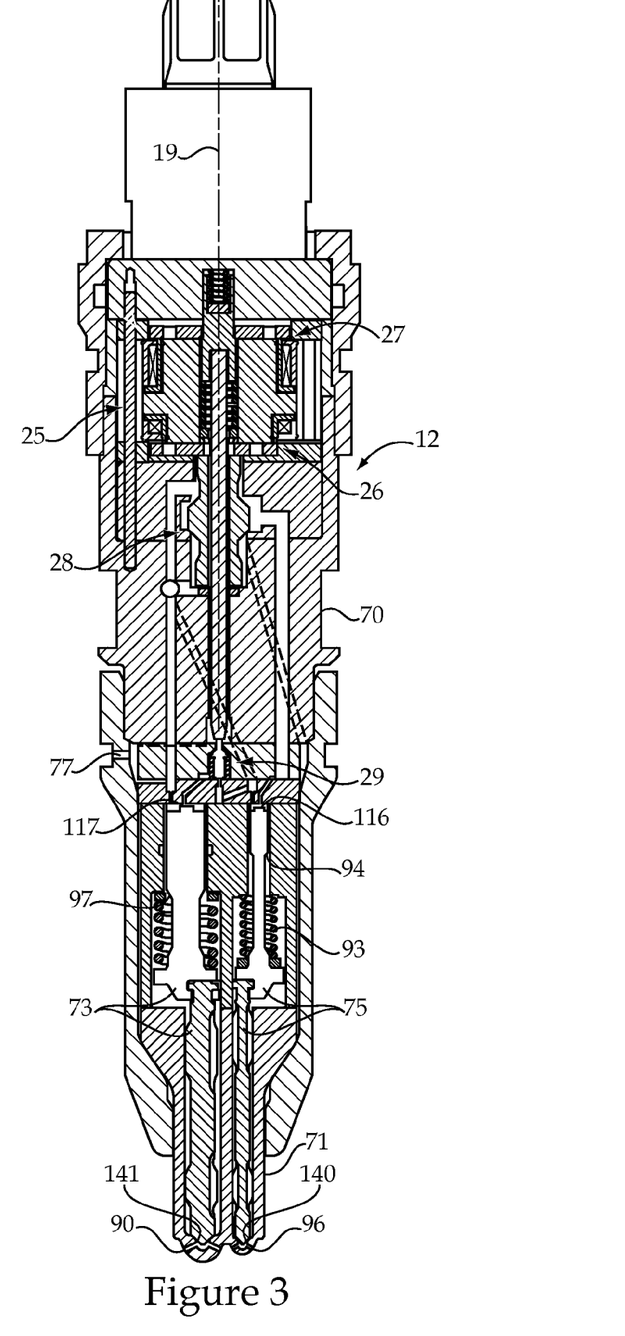
FIG. 3 is a sectioned side view of a top portion of one of the fuel injectors from FIG. 1.
Figure 4:
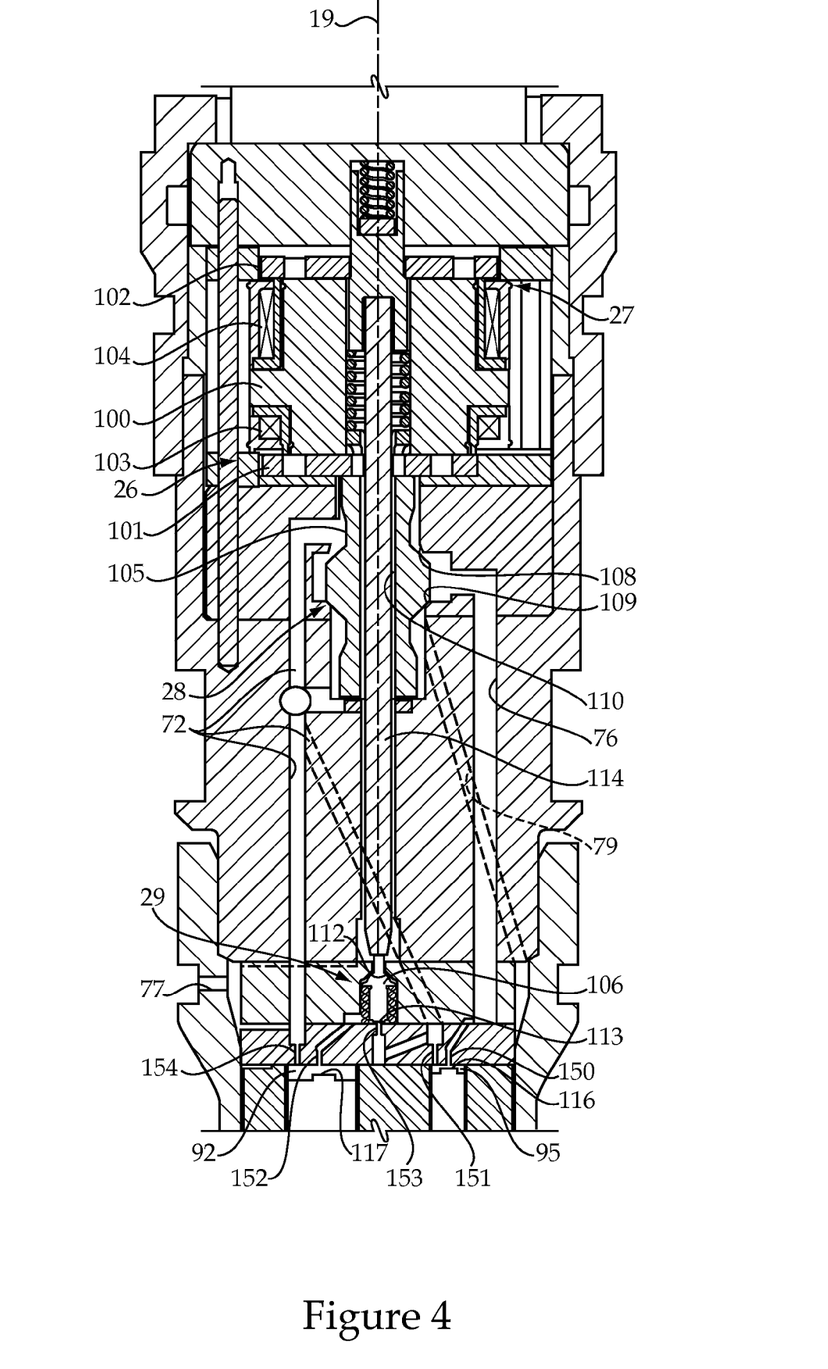
FIG. 4 is a sectioned side view of a top portion of the fuel injector of FIG. 3.
Figure 5:
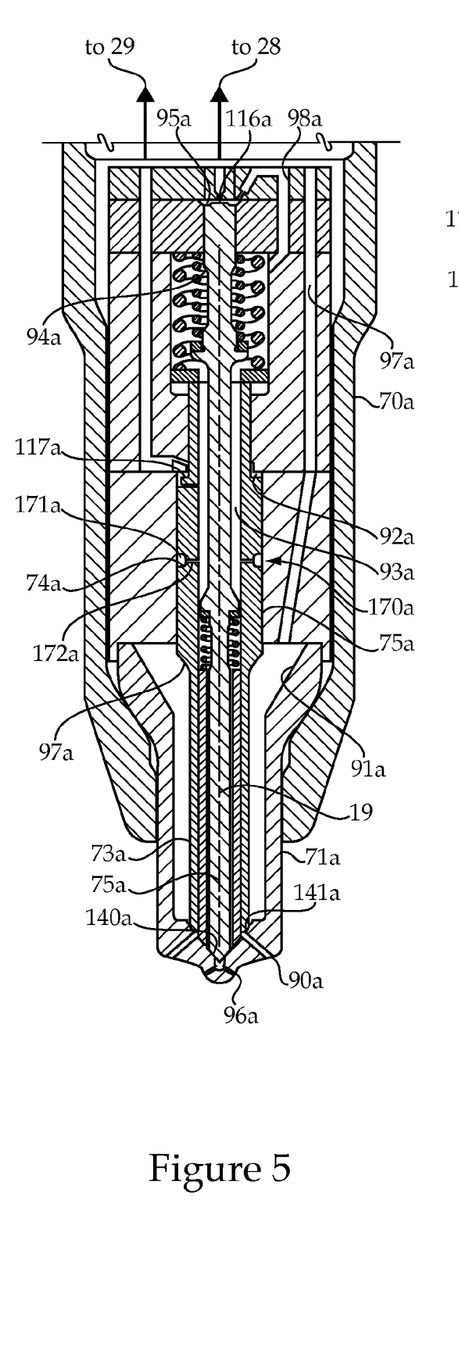
FIG. 5 is a sectioned side view of a bottom portion of a fuel injector according to another aspect of the present disclosure.
Figure 6:
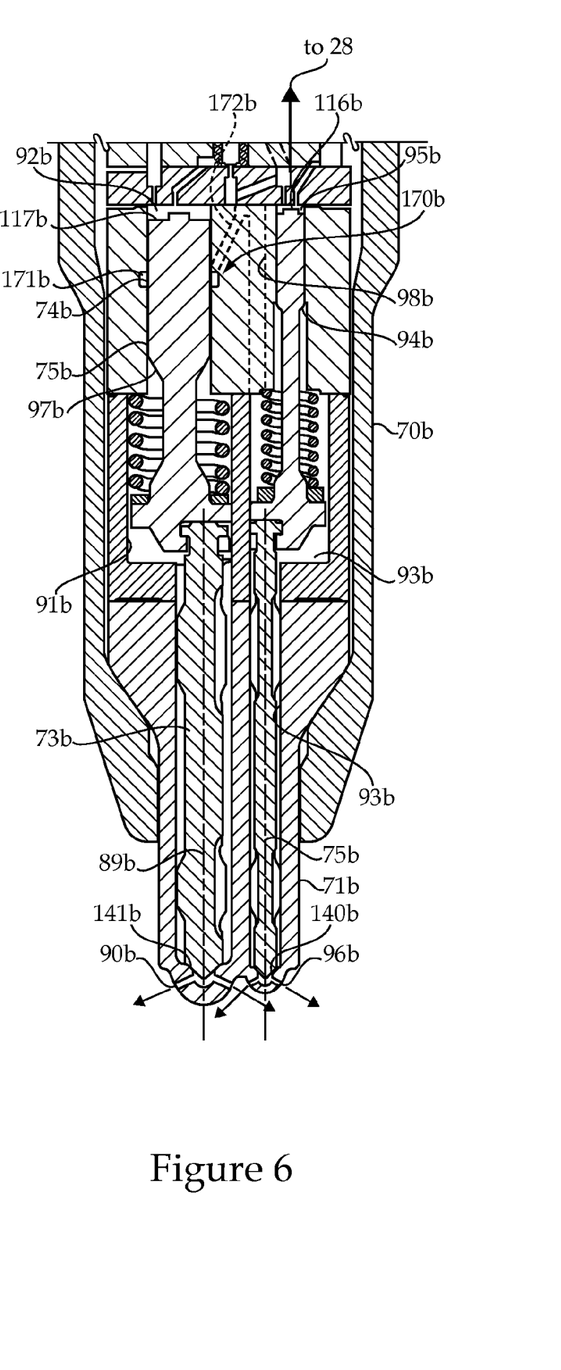
FIG. 6 is a sectioned side bottom portion view of the fuel injector of FIG. 3.

Referring now to FIGS. 3-6, each of the fuel injectors 12 includes two control valves 28, 29 that are individually actuated via respective electrical solenoid actuators 26, 27 in control communication with electronic controller 15. In the illustrated embodiment, the two control valves 28, 29 are each three way valves that open and close respective passageways to a low pressure drain outlet 77. As shown in FIG. 1, drain outlet 77 is fluidly connected to tank 23 via a drain return line 24. Thus, those skilled in the art will recognize that all of the control functions for fuel injector 12 are performed using the liquid fuel as a hydraulic medium in a manner well known in the art. FIGS. 5 and 6 show two different versions of a bottom portion of fuel injector 12. FIG. 5 showing a version in which the fuel injector has a concentric gas nozzle outlet set 90a and liquid fuel nozzle outlet set 96a, whereas FIG. 6 shows a configuration in which the gas nozzle outlet set 90b is side by side with the liquid fuel nozzle outlet set 96b. Identical features in the two different fuel injector versions are identified with the same numerals, but the numerals include an "a" in the case of the dual concentric configuration of FIG. 5, and include a designation "b" in the case of the side by side version of FIG. 6. In both versions, the respective gas needle valve member 73 and liquid needle valve member 75 seat at different locations on the same tip component 71 of the injector body 70. Thus, both nozzle outlet sets 90 and 96 are defined by a single tip component 71.

In addition to defining liquid nozzle outlet set 96 and gaseous nozzle outlet set 90, injector body 70 also defines liquid fuel inlet 57 (FIG. 2) that opens into a liquid nozzle supply passage 98, which is fluidly connected to liquid nozzle chamber 93 via passages not visible in the sections view of FIGS. 3-6. In addition, injector body 70 defines a gaseous fuel inlet 48 (FIG. 2) that opens into a gaseous nozzle supply passage 97 that is fluidly connected to gaseous nozzle chamber 91, again via passages not visible in the sectional views of FIGS. 3-6. A liquid control chamber 95 is fluidly connected to liquid fuel inlet 57 via a pressure passage 72 and a Z-orifice 151, and a gaseous control chamber 92 is also fluidly connected to liquid fuel inlet 57 via pressure passage 72 and a Z-orifice 154. High pressure passage 72 is fluidly connected to liquid fuel inlet 57, and hence liquid fuel common rail 14, via internal passages within fuel injector 12 that are not visible in the section views of FIGS. 3-6.

The liquid needle control valve 28 is positioned in injector body 70 and is movable responsive to first solenoid actuator 26 to control pressure in liquid control chamber 95. In particular, liquid needle control valve 28 includes a control valve member 105 that is trapped to move between a lower conical seat 109 and an upper conical seat 108. Control valve member 105 may be attached to move with armature 101 responsive to energizing and de-energizing of coil 103 of solenoid actuator 26, rendering them operably coupled to each other. When solenoid actuator 26 is de-energized, control valve member 105 is biased into contact with lower conical seat 109 to close a fluid connection between liquid control chamber 95 and drain outlet 77. The fluid connection includes an A-orifice 150, pressure passage 76 and a drain passage 79 shown with dotted lines. When control valve member 105 is out of contact with lower conical seat 109 and in contact with upper conical seat 108, the fluid connection from drain outlet 77 to liquid control chamber 95 is open. Thus, the liquid control chamber 95 is fluidly connected to the liquid fuel inlet 57 through two passages in parallel when control valve member 105 is in contact with lower conical seat 109. One of the two passages includes the A-orifice 150 and the other of the two parallel passages includes the Z-orifice 151. When in this position, pressure in liquid control chamber 95 is high and acts upon closing hydraulic surface 116 to urge liquid needle valve member 75 downward into contact with seat 140 to close the fluid connection between liquid nozzle chamber 93 and liquid nozzle outlet set 96. When control valve member 105 is in an upward position in contact with upper conical seat 108, control chamber 95 becomes fluidly connected to low pressure drain outlet set 77 via A-orifice 150, pressure passage 76 and drain passage 79, causing pressure in control chamber 95 to drop despite the continued fluid connection to high pressure via Z-orifice 151. When this occurs, liquid needle valve member 75 can move upward due to a hydraulic force on opening hydraulic surface 94 positioned in liquid nozzle chamber 93 against the action of its biasing spring to open the fluid connection between liquid nozzle chamber 93 and liquid nozzle outlet set 96 to facilitate a liquid fuel injection event. Movement of control valve member 105 from its contact with lower conical seat 109 to contact with upper conical seat 108 may be facilitated by energizing solenoid actuator 26 to move armature 101 toward coil 103 in a known manner.

Gaseous needle control valve 29 is also positioned in injector body 70 and includes a control valve member 106 that is trapped to move between a conical seat 112 and a flat valve seat 113. Control valve member 106 is not attached to, but is operably coupled to solenoid actuator 27 via a pusher 114 that is attached to move with armature 102 responsive to energizing coil 104 of solenoid actuator 27. When solenoid actuator 27 is de-energized, control valve member 106 is biased upward into contact with conical seat 112 to close a fluid connection between gaseous control chamber 92 and drain outlet 77. Although the fluid connection to drain outlet 77 is closed, the gaseous control chamber 92 is fluidly connected to liquid fuel inlet 57 through two passages in parallel. The first of these two passages includes high pressure passage 72, F-orifice 153, and A-orifice 152. The second of these two parallel passages includes high pressure passage 72 and Z-orifice 154. When in this position, high pressure prevails and gaseous nozzle chamber 92 acting on closing hydraulic surface 117 to urge gaseous needle valve member 73 downward into contact with nozzle seat 141 to close the fluid connection between gaseous nozzle chamber 91 and gaseous nozzle outlet set 90. When solenoid actuator 27 is energized, armature 102 is pulled toward coil 104. When this occurs, pusher 114 is moved downward to push control valve member 106 out of contact with conical seat 112 and into contact with flat valve seat 113. When control valve member 106 is in its downward position in contact with flat valve seat 113, gaseous control chamber 92 is fluidly connected to drain outlet 77 via A-orifice 152 to lower pressure in control chamber 92 acting on closing hydraulic surface 117 of gaseous needle valve member 73.

When control valve member is in its downward position closing flat valve seat 113, and the fluid connection between gaseous control chamber 92 and drain outlet 77 is opened, fluid pressure in control chamber 92 drops allowing the lifting or opening force acting on opening pneumatic surface 97, which is positioned in gaseous nozzle chamber 91, to cause gaseous needle valve member 93 to move upward out of contact with nozzle seat 141 to open the fluid connection between gaseous nozzle chamber 91 and gaseous nozzle outlet set 90 to facilitate a gaseous fuel injection event.

In the illustrated embodiment, liquid control valve member 105, gaseous control valve member 106, armature 101, and armature 102 all move along a common centerline 19. This movement is partially facilitated by a structure that allows pusher 114 to extend through, and move through, a bore 110 defined by control valve member 105, without interacting therewith to maintain independent control of both liquid and gaseous fuel injection events. Thus, in the illustrated embodiment, three way control valve 28 can be thought of as being operably coupled to a first solenoid actuator 26, whereas three way control valve 29 can be thought of as being operably coupled to second electrical actuator 27. Although first and second solenoid actuators 26 and 27 have separate coils 103 and 104, they may share a common stator 100 without departing from the present disclosure. In the embodiment of FIG. 6, liquid needle valve member 75b and gaseous needle valve member 73b move parallel to, but offset from common centerline 119 when moving to open and close the respective nozzle outlet sets 96b and 90b. In the alternative design shown in FIG. 5, liquid needle valve member 75a and gaseous needle valve member 73a move along common centerline 19 when moving to open and close liquid nozzle outlet set 96a in gaseous nozzle outlet set 90a.

Each of the fuel injectors 12 can be thought of as having a non-injection configuration when solenoid actuators 26 and 27 are de-energized and liquid control valve member 105 is in its downward position in contact with conical seat 109 and gaseous control valve member is in its upward position in contact with conical seat 112. Each of the fuel injectors 12 can also be considered to have a liquid fuel injection configuration in which solenoid actuator 26 is energized, control valve member 105 is in its upward position in contact with upper conical seat 108 but out of contact with lower conical seat 109 and the liquid needle valve member 75 is out of contact with nozzle seat 140. Each of fuel injector 12 also includes a gaseous fuel injection configuration in which solenoid actuator 27 is energized, control valve member 106 is out of contact with conical seat 112 but in contact with flat valve seat 113, and gaseous needle valve member 73 is out of contact with nozzle seat 141. Each fuel injector 12 can also be considered to have a combined fuel injection configuration in which both solenoid actuators 26 and 27 are energized and the other components are in the positions just described to facilitate simultaneous injection of gaseous and liquid fuels.

As best shown in FIGS. 5 and 6, fuel injector 12 includes a hydraulic lock seal 170 to inhibit migration of gaseous fuel from gaseous nozzle chamber 91 into liquid nozzle chamber 93 along guide segment 74 of gaseous needle valve member 73. Hydraulic lock seal 170 includes an annular volume 171 that surrounds guide segment 174 of gaseous needle valve member 73, and a seal passage 172 that fluidly connects the annular volume 171 to liquid nozzle chamber 93, which is always fluidly connected to liquid fuel common rail 14 via liquid supply passage 98. The normally small pressure differential between the liquid fuel and the gaseous fuel inhibits gaseous fuel from migrating along guide segment 74, and also allows a small amount of liquid fuel into the guide clearance along guide segment 74 to maintain lubricity of gaseous needle valve member 73. Thus, one could expect during normal dual fuel operations a small amount of liquid fuel to leak from hydraulic lock seal 170 into gaseous nozzle chamber 91. This leaked liquid fuel is ejected from fuel injector 12 at the commencement of each gaseous fuel injection event, and may or may not contribute significantly to the overall heat release in one engine cycle.

INDUSTRIAL APPLICABILITY

The dual fuel common rail system 10 of the present disclosure finds general applicability to any engine that utilizes two fuels in the combustion space of an associated engine. These two fuels may be the same fuel at two different pressures, or may, as in the illustrated embodiment be different fuels. Although the present disclosure could apply to spark ignited engines utilizing appropriate fuels, the present disclosure finds particular applicability in gaseous fuel engines that utilize a relatively large charge of natural gas that is ignited via compression ignition of a small charge of distillate diesel fuel originating from common rail 14. The coaxial quill assembly 118 of the present disclosure can facilitate movement of both fuels to a fuel injector 12 mounted in the head 6 of an engine 5 via a single bore through the engine head associated with each fuel injector 12 of the engine 5. This strategy conserves valuable space in and around the engine.

By utilizing a block 120 that is bolted to the outer surface of the engine head, separate load adjusters 60 and 66 can be utilized to independently load the inner tube 50 and outer tube 40 onto the conical seats 57 and 46, respectively of fuel injector 12 to inhibit fuel leakage between the fuels and to inhibit fuel leakage to atmosphere outside of fuel injector 12, while accounting for slight dimensional differences associated with each fuel injector fluid connection.

When in operation, the first fuel (distillate diesel) at a first pressure moves from first common rail 14 through the first fuel passage 32, through inner tube 50 and into fuel injector 12. The second fuel at a second pressure is moved from the second common rail 16 through the second fuel passage 35, through the outer passage 49 between outer tube 40 and inner tube 50 and into fuel injector 12. Leakage of the second fuel to the first fuel may be inhibited by setting the pressure in common rail 14 to a medium high pressure (may be about 40 MPa) higher than the pressure in common rail 16 to medium low pressure (may be about 35 MPa). Leakage of the liquid fuel into the gaseous fuel includes setting a compression load on the inner tube 50 above a first predetermined threshold with the compression load adjuster 66 to create appropriate sealing forces on both ends of tube 50. Leakage of the second fuel to atmosphere may be inhibited by setting a compression load on the outer tube 40 above a second predetermined threshold with the second load adjuster 60 to create a seal between outer tube 40 and fuel injector 12. Leakage of gaseous fuel to atmosphere is inhibited by including at least one o-ring, such as o-ring 80 in contact with outer tube 40. Nevertheless, those skilled in the art will appreciate that other concentric tube supply arrangements could be utilized without departing from the present disclosure. However, in the illustrated embodiment, leakage and variations in geometrical tolerances in the various components of engine 5 and fuel system 10 can be accommodated by utilizing first and second compression load adjusters 60 and 66 to respectively adjust the compression loads in the outer tube 40 and the inner tube 50 individually.

The fuel system 10 according to the present disclosure also includes several subtle functions providing advantages over known dual fuel systems. Among these are independent injection control via separate valves and separate electrical actuators for each of the gas and liquid systems. Thus, the fuel injector 12 can be controlled to inject gaseous fuel only, liquid fuel only, both gaseous and liquid fuel simultaneously, and of course have a non-injection mode when no injection occurs. Although the migration of gaseous fuel into the liquid fuel is generally inhibited by maintaining the liquid fuel common rail 14 at a higher pressure than the gaseous fuel common rail 16 other subtle but important features assist in preventing such leakage. Cross leakage issues are also inhibited by locating the liquid fuel supply in the inner tube 50, and locating the gaseous fuel supply to injectors 12 in the outer passage 49 between inner tube 50 and outer tube 40. By locating these passageways concentrically, each fuel injector 12 can be supplied with both fuels via one passageway through the engine housing 6 (head) rather than two passageways. Lubricity of the moving components within the fuel injector 12 are maintained by exposure to liquid diesel fuel. For instance, the guide clearance associated with gas needle 73 is maintained with liquid diesel fuel to maintain lubricity, even though one end of the gas needle 73 is always exposed to gaseous fuel in gas nozzle chamber 91.

By utilizing the concentric supply strategy, the fuel system 10 of the present disclosure presents a potential opportunity for retrofitting existing engines with minimized engine cylinder head modifications. The structure of both versions of fuel injectors 12 also inhibits the leakage of gaseous fuel into the engine cylinder by locating both the gaseous fuel nozzle outlets 90 and the liquid fuel nozzle outlets 96 in a single tip component 71, rather than via some nested needle strategy of a type known in the art. Thus, the fuel injector 12 of the present disclosure avoids stacked tolerances and other uncertainties by making each of the gas and liquid needle structures completely independent in their movement, seating and biasing features. This strategy may better enable mass production of fuel injectors that perform consistently with the same control signals. Finally the engine 5 of the present disclosure contemplates both a normal dual fueling mode and a limp home mode in which only liquid fuel is injected. For instance, if a malfunction occurs in the gaseous fuel system or if the gaseous fuel supply is exhausted, the electronic controller 15 may cause or allow the engine to switch from a dual fueling mode to the limp home mode.

During normal operations, gaseous and liquid fuels are injected through a respective gaseous nozzle outlet set 90 and a liquid nozzle outlet set 96 of fuel injector 12 into an engine cylinder 7 in one engine cycle. The liquid fuel is compression ignited, which in turn ignites the larger charge of gaseous fuel. As stated earlier, injection of liquid and gaseous fuels involves moving armature 101, armature 102, liquid control valve member 105 and gas control valve member 106 along a common centerline 19. When the liquid control valve member 105 is moved from a non-injection configuration to a liquid fuel injection configuration, one of the two parallel passages fluidly connecting the liquid needle control chamber 95 to the liquid common rail 14 is closed, while opening a fluid connection from the liquid needle control chamber 95 to the drain outlet 77. Thus, the A-orifice 150 switches from being fluidly connected to high pressure passage 72, over to being fluidly connected to drain outlet 77 by movement of liquid control valve member 105. Movement of gas control valve member 106 to facilitate a gas fuel injection event includes closing one of two parallel passages fluidly connecting the gaseous needle control chamber 92 to the liquid fuel common rail 14, and opening of fluid connection from the gaseous needle control chamber 92 to the drain outlet 77. In other words, the gaseous needle control chamber 92 would previously be fluidly connected to high pressure passage 72 via A-orifice 152 and F-orifice 153 prior to movement of control valve member 106, but be fluidly connected to drain outlet 77 via A-orifice 152 after movement of control valve member 106, which also closes F orifice 153 at flat valve seat 113.

By seating both control valve members 105 and 106 on conical valves seats 109 and 112, respectively, during a non-injection configuration, leakage of liquid fuel is limited and may be substantially prevented, especially relative to counterpart fuel systems that utilize the flat valve seats between the drain outlet and the pressure control chambers. Those with ordinary skill in the art will recognize that liquid control valve member 105 and gas control valve member 106 contact their respective conical seats 109 and 112 at different locations along common centerline 19. Fuel injectors 12 of the present disclosure also provide an advantage of hastening closure of the gaseous nozzle outlet set 90 to end a gaseous fuel injection event by fluidly connecting the gaseous needle control chamber 92 to the liquid fuel common rail 14 through two passages in parallel when control valve member 106 moves from contact with flat valve seat 113 back up into contact with conical valve seat 112. Likewise, closure of the liquid nozzle outlet set 96 is hastened to end a liquid fuel injection event by fluidly connecting the liquid needle control chamber 95 to the liquid fuel common rail 14 through two passages in parallel when control valve member 105 moves downward from contact with conical seat 108 into contact with conical seat 109. This action allows a quicker settling of pressure in the respective control chambers 95 and 92 to shorter potential dwell times between injection events by more quickly raising pressure in those chambers at the end of an injection event.

Figure 7:
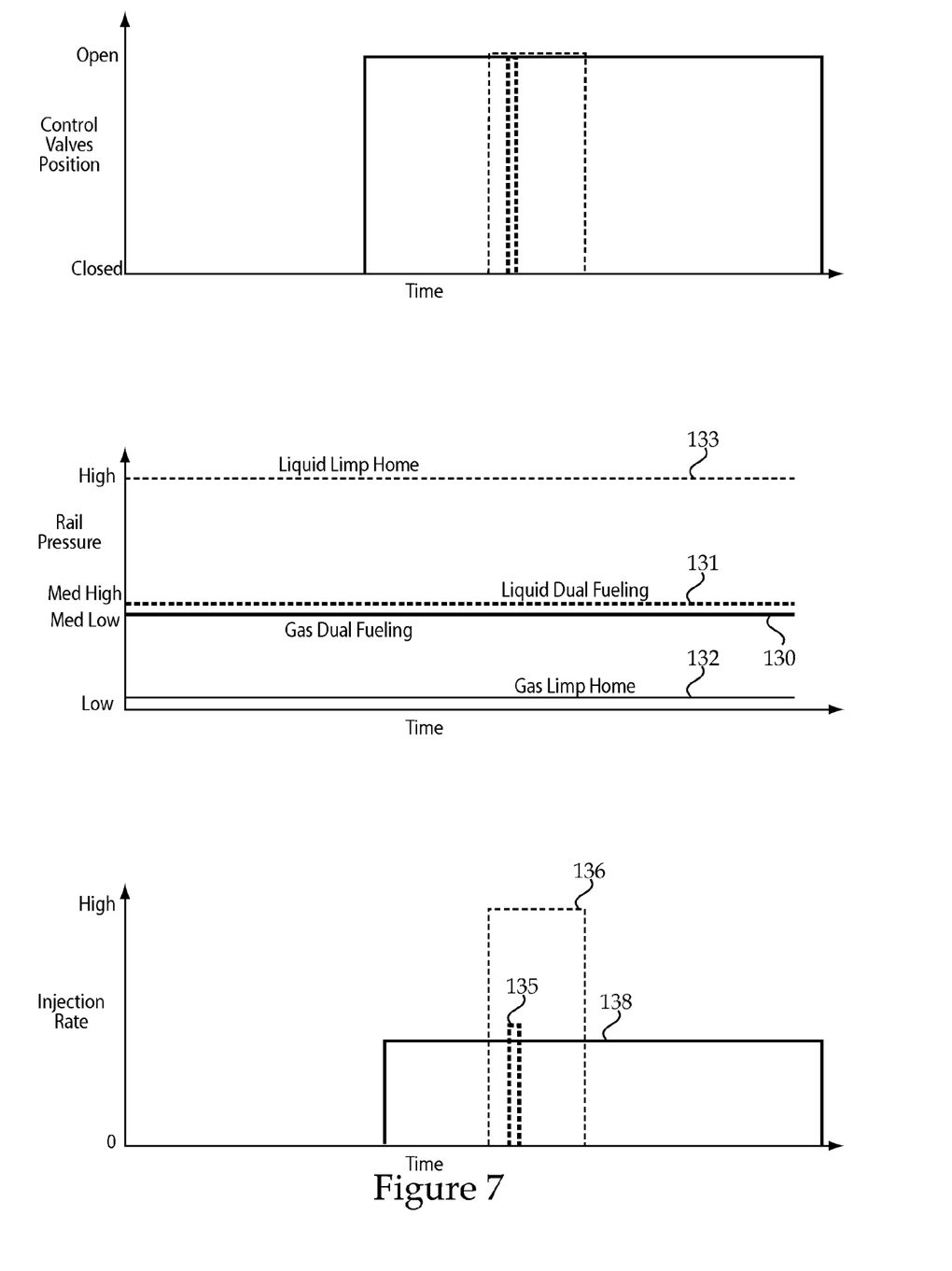
FIG. 7 is a series of graphs showing control valve positions, gaseous and liquid fuel rail pressures and injection rates verses time for the dual fuel system of FIG. 1 when operating in a dual fueling mode and a limp home mode.

As best shown in FIG. 7, the dual fueling mode is characterized by a large gas injection quantity 138 and a small quantity injection 135 of liquid fuel. On the otherhand, the limp home mode may be characterized by no gas injection but a large quantity 136 liquid fuel injection. In addition, the normal dual fueling mode is characterized by the gas and liquid common rails 16 and 14 being maintained at medium low and medium high pressures, respectively. On the otherhand, the limp home mode may be characterized by the gaseous fuel common rail being allowed to decay to, or be maintained at, a low pressure, while pressure in the liquid common rail 14 is increased to a high pressure 133 (may be greater than 100 MPa). When operating in the dual fueling mode, a relatively small injection of liquid distillate diesel fuel is compression ignited to in turn ignite a relatively large charge of gaseous fuel at least partially previously injected into the engine cylinder. On the otherhand, during a limp home mode, engine 5 functions as a somewhat conventional diesel engine in which a relatively large quantity of liquid fuel is injected at or around top dead center of the compression stroke to instantaneously ignite upon injection in a known manner.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A fuel injector comprising:
   an injector body defining a first nozzle outlet set, a first fuel inlet, a second nozzle outlet set, a second fuel inlet, and a drain outlet and having disposed therein a first nozzle chamber fluidly connected to the first fuel inlet, a second nozzle chamber fluidly connected to the second fuel inlet, a first control chamber fluidly connected to the first fuel inlet, and a second control chamber fluidly connected to the first fuel inlet;
   a first needle control valve positioned in the injector body and including a first control valve member movable between a first position in contact with a conical seat to close a first fluid connection between the first control chamber and the drain outlet, and a second position out of contact with the conical seat to open the first fluid connection;
   a second needle control valve positioned in the injector body and including a second control valve member movable between a first position in contact with a conical seat to close a second fluid connection between the second control chamber and the drain outlet, and a second position out of contact with the conical seat to open the second fluid connection;
   a first solenoid actuator with a first armature operably coupled to the first needle control valve;
   a second solenoid actuator with a second armature operably coupled to the second needle control valve; and
   the first control valve member, the second control valve member, the first armature and the second armature move along a common centerline.

2. The fuel injector of claim 1 wherein the first control valve member is trapped to move between an upper conical seat and a lower conical seat;
   the second control valve member is trapped to move between the conical seat and a flat valve seat; and
   each of the first and second control chambers is fluidly connected to the first fuel inlet through two passages in parallel when the first and second control valve members are in their respective first positions.

3. The fuel injector of claim 1 wherein the first solenoid actuator and the second solenoid actuator have separate coils but share a shared stator.

4. The fuel injector of claim 1 wherein the first fuel inlet is surrounded by an inner conical seat and an outer conical seat;
   the second fuel inlet opens between the inner conical seat and the outer conical seat; and
   the first nozzle outlet set and the second nozzle outlet set are defined by a tip component of the injector body.

5. The fuel injector of claim 1 including a first needle valve member with an opening hydraulic surface positioned in the first nozzle chamber, a closing hydraulic surface positioned in the first control chamber, and being movable into and out of contact with a first nozzle seat to close and open, respectively, the first nozzle chamber to the first nozzle outlet set; and
   a second needle valve member with an opening pneumatic surface positioned in the second nozzle chamber, a closing hydraulic surface positioned in the second control chamber, and being movable in and out of contact with a second nozzle seat to close and open, respectively, the second nozzle chamber to the second nozzle outlet set.

6. The fuel injector of claim 5 including a hydraulic lock seal that includes an annular volume surrounding a guide segment of the second needle valve member, and a seal passage fluidly connecting the annular volume to the first nozzle chamber.

7. The fuel injector of claim 6 wherein each of the first and second needle valve members move parallel to, but offset from, the common centerline.

8. The fuel injector of claim 7 wherein the first control valve member is trapped to move between an upper conical seat and a lower conical seat; and
the second control valve member is trapped to move between the conical seat and a flat valve seat;
the first solenoid actuator and the second solenoid actuator have separate coils but share a common stator;
the first fuel inlet is surrounded by a first common rail conical seat and a second common rail conical seat;
the second fuel inlet opens between the first common rail conical seat and the second common rail conical seat;
the first nozzle outlet set and the second nozzle outlet set are defined by a tip component of the injector body; and
each of the first and second control chambers is fluidly connected to the first fuel inlet through two passages in parallel when the first and second control valve members are in their respective first positions.

9. A dual fuel system comprising:
a plurality of fuel injectors that have a non-injection configuration, a liquid fuel injection configuration, a gaseous fuel injection configuration and a combined fuel injection configuration;
a gaseous fuel common rail fluidly connected to each of the fuel injectors;
a liquid fuel common rail fluidly connected to each of the fuel injectors; and
each of the fuel injectors includes a three way gas control valve with a gas control valve member and a three way liquid control valve with a liquid control valve member that each move along a common centerline;
a gas control chamber of each fuel injector being fluidly connected to the liquid fuel common rail by two passages in parallel when the gas control valve member is in a first position; and
a liquid control chamber of each fuel injector being fluidly connected to the liquid fuel common rail by two passages in parallel when the liquid control valve member is in a first position.

10. The dual fuel system of claim 9 wherein each of the fuel injectors includes a first electrical actuator operably coupled to the three way liquid control valve and a second electrical actuator operably coupled to the three way gas control valve;
the second electrical actuator includes an armature attached to move with a pusher that extends through a bore defined by the liquid control valve member.

11. The dual fuel system of claim 10 wherein the first electrical actuator and the second electrical actuator share a common stator.

12. The dual fuel system of claim 11 wherein each of the fuel injectors is fluidly connected to a quill by a pair of concentric tubes.

13. The dual fuel system of claim 12 including an electronic controller in control communication with a gas pressure control device, a liquid pressure control device and each of the fuel injectors, and including a dual fuel control algorithm configured to maintain a small pressure differential between the liquid fuel common rail and the gaseous fuel common rail, and a single fuel control algorithm configured to maintain a large pressure differential between the liquid fuel common rail and the gaseous fuel common rail.

14. The dual fuel system of claim 13 wherein each of the fuel injectors includes a hydraulic lock seal with an annular volume that surrounds a guide segment of a gas needle valve member, and a seal passage that fluidly connects the annular volume to the liquid fuel common rail.

15. A method of operating a dual fuel system comprising the steps of:
injecting gaseous and liquid fuels through a gaseous nozzle outlet set and liquid nozzle outlet set, respectively, of a fuel injector into an engine cylinder in an engine cycle;
compression igniting the liquid fuel;
wherein the step of injecting includes moving a first armature, a second armature, a liquid control valve member, and a gas control valve member along a common centerline; and
wherein the step of moving a liquid control valve member includes closing one of two passages fluidly connecting a liquid needle control chamber to a liquid common rail and opening a fluid connection from the liquid needle control chamber to a drain outlet; and
wherein the step of moving a gaseous control valve member includes closing one of two passages fluidly connecting a gaseous needle control chamber to the liquid common rail and opening a fluid connection from the gaseous needle control chamber to the drain outlet.

16. The method of claim 15 including a step of limiting fuel leakage when the fuel injector is in a non-injection configuration by contacting the liquid control valve member and the gaseous control valve member with respective conical valve seats at different locations along the common centerline.

17. The method of claim 16 including a step of hastening closure of the gaseous nozzle outlet set to end a gaseous fuel injection event by fluidly connecting the gaseous needle control chamber to the liquid fuel common rail through two passages in parallel; and
hastening closure of the liquid nozzle outlet set to end a liquid fuel injection event by fluidly connecting the liquid needle control chamber to the liquid fuel common rail through two passages in parallel.

18. The method of claim 16 wherein the injecting steps include moving a gaseous needle valve member and a liquid needle valve member parallel to, but offset from, the common centerline.

* * * * *